United States Patent
Fujisawa et al.

(10) Patent No.: US 10,209,159 B2
(45) Date of Patent: Feb. 19, 2019

(54) DISPLACEMENT DETECTING DEVICE FOR STRUCTURAL OBJECT, SHARING SYSTEM OF DISPLACEMENT OF STRUCTURAL OBJECT, AND METHOD AND PROGRAM OF DETECTING DISPLACEMENT OF STRUCTURAL OBJECT

(71) Applicant: Furuno Electric Co., Ltd., Nishinomiya (JP)

(72) Inventors: Naomi Fujisawa, Nishinomiya (JP); Hiraku Nakamura, Osaka (JP); Masashi Imasaka, Nishinomiya (JP); Tatsuya Sonomoto, Osaka (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 190 days.

(21) Appl. No.: 15/120,368

(22) PCT Filed: Jan. 20, 2015

(86) PCT No.: PCT/JP2015/051300
§ 371 (c)(1),
(2) Date: Aug. 19, 2016

(87) PCT Pub. No.: WO2015/125532
PCT Pub. Date: Aug. 27, 2015

(65) Prior Publication Data
US 2017/0059445 A1    Mar. 2, 2017

(30) Foreign Application Priority Data

Feb. 21, 2014   (JP) ................................. 2014-031223

(51) Int. Cl.
*G01M 5/00*      (2006.01)
*G01C 15/00*      (2006.01)
(Continued)

(52) U.S. Cl.
CPC ............ *G01M 5/0041* (2013.01); *E01D 19/00* (2013.01); *E04B 1/98* (2013.01); *E04H 9/027* (2013.01);
(Continued)

(58) Field of Classification Search
CPC ........ G01M 5/0041; E01D 19/00; E04B 1/98; E04H 9/027; G01C 15/00; G01S 19/53; B63B 39/00
(Continued)

(56) References Cited

U.S. PATENT DOCUMENTS

2009/0171619 A1    7/2009   Van Cranenbroeck
2010/0271199 A1*   10/2010   Belov ..................... G01M 5/00
                                                       340/539.3
(Continued)

FOREIGN PATENT DOCUMENTS

JP    S6157806 U    4/1986
JP    H1163987 A    3/1999
(Continued)

OTHER PUBLICATIONS

ISA Japan Patent Office, International Search Report Issued in Application No. PCT/JP2015/051300, dated Apr. 21, 2015, WIPO, 4 pages.
(Continued)

*Primary Examiner* — Eman A Alkafawi
(74) *Attorney, Agent, or Firm* — Alleman Hall Creasman & Tuttle LLP

(57) ABSTRACT

A displacement detecting device for a structural object is capable of accurately measuring displacement of the structural object. The displacement detecting device includes first and second attitude data calculators, a data extractor, and a displacement calculator. The first attitude data calculator calculates attitude data at a first position by using received
(Continued)

positioning signals, and calculates a calculated time point of the attitude data of the first position based on a time of a positioning system. The second attitude data calculator calculates attitude data at a second position by using received positioning signals, and calculates a calculated time point of the attitude data of the second position based on the time of the positioning system. The displacement calculator calculates a displacement amount and a displacement direction of the structural object by using a difference between the attitude data of the first and second positions calculated at the same time point.

13 Claims, 9 Drawing Sheets

(51) Int. Cl.
    *G01S 19/53*     (2010.01)
    *E01D 19/00*     (2006.01)
    *E04H 9/02*     (2006.01)
    *E04B 1/98*     (2006.01)
    *B63B 39/00*     (2006.01)

(52) U.S. Cl.
    CPC .............. *G01C 15/00* (2013.01); *G01S 19/53* (2013.01); *B63B 39/00* (2013.01)

(58) Field of Classification Search
    USPC .................................................. 702/43, 183
    See application file for complete search history.

(56) References Cited

U.S. PATENT DOCUMENTS

| | | | |
|---|---|---|---|
| 2012/0173150 A1* | 7/2012 | Romero | G01S 13/885 702/14 |
| 2013/0132032 A1* | 5/2013 | McKeown | G01M 5/0041 702/182 |
| 2013/0291637 A1 | 11/2013 | Dorner et al. | |

FOREIGN PATENT DOCUMENTS

| | | |
|---|---|---|
| JP | 2001264059 A | 9/2001 |
| JP | 2004354192 A | 12/2004 |
| JP | 2005121464 A | 5/2005 |
| JP | 2007078602 A | 3/2007 |
| JP | 2008175676 A | 7/2008 |

OTHER PUBLICATIONS

Roberts, G. W. et al., "Structural Dynamic and Deflection Monitoring Using Integrated GPS and Triaxial Accelerometers," In Proceedings of the 13th International Technical Meeting of the Satellite Division of the Institute of Navigation (ION GPS 2000), Salt Lake City, UT, USA, Sep. 19, 2000, 10 pages.

Caporali, A. et al., "Interferometric Attitude and Direction Sensor Using GPS Carrier Phase Data," In Proceedings of the Bilateral Geodetic Meeting, Italy, Jan. 1, 2003, 21 pages.

* cited by examiner

[TORSION]

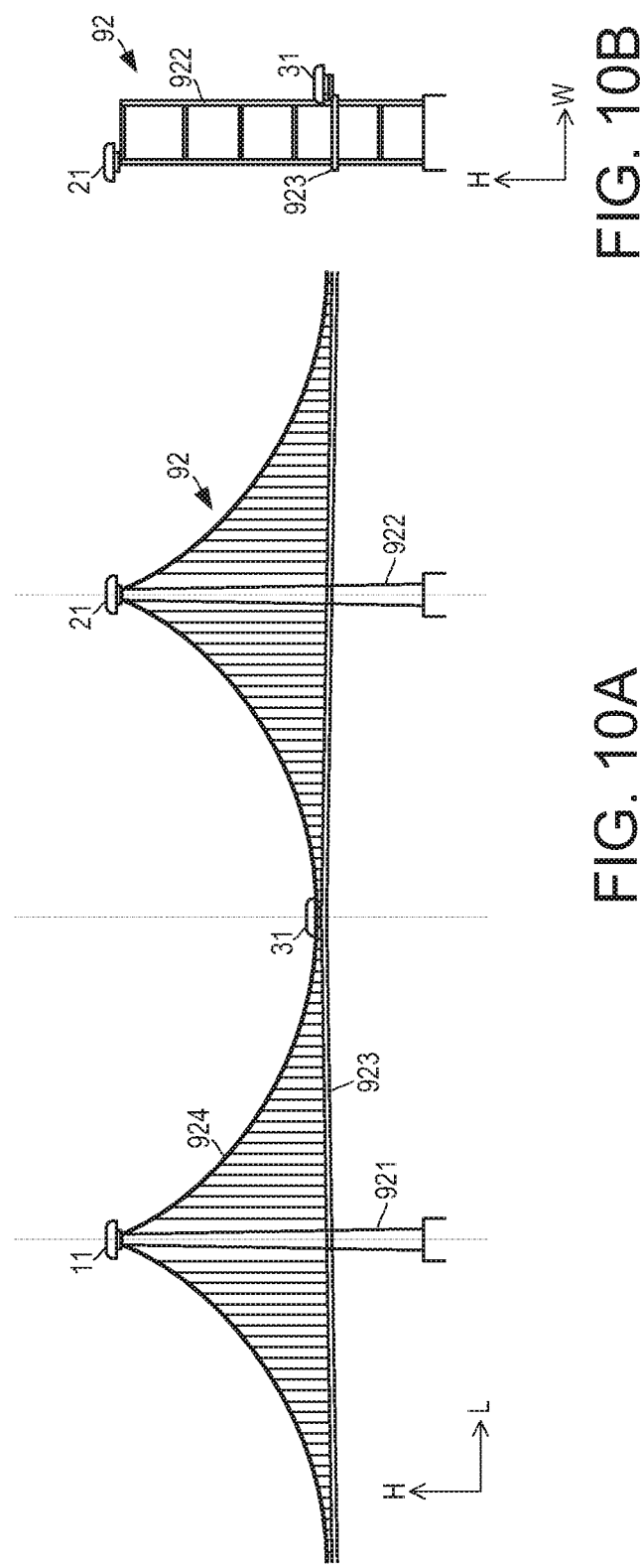

DISPLACEMENT DETECTING DEVICE FOR STRUCTURAL OBJECT, SHARING SYSTEM OF DISPLACEMENT OF STRUCTURAL OBJECT, AND METHOD AND PROGRAM OF DETECTING DISPLACEMENT OF STRUCTURAL OBJECT

TECHNICAL FIELD

This disclosure relates to a displacement detecting device, a sharing system of displacement, a method and program of detecting displacement, which calculate the displacement, such as torsion, bending, sway, etc. of a structural object.

BACKGROUND ART

Conventionally, various kinds of methods of calculating displacement, such as torsion, bending, etc. of large movable bodies, such as ships and aircrafts, architectural objects, such as houses and buildings, and structural objects, such as bridges, are put in practical use. One of such methods is visual checking. Moreover, as Patent Document 1 discloses, a method of using a measurement by a laser beam exists. Furthermore, a method of using a strain gauge exists.

REFERENCE DOCUMENT OF CONVENTIONAL ART

Patent Document

Patent Document 1: JP1999-063987A

DESCRIPTION OF THE DISCLOSURE

Problems to be Solved by the Disclosure

However, in a case of checking visually, it is not easy to accurately detect displacement of a structural object. Further, displacement due to long period vibration is difficult to recognize visually, and it is not easy to calculate the displacement. Moreover, in the case of using the laser beam as disclosed in Patent Document 1, the size of an equipment required just for the displacement detection increases, and the displacement of the structural object cannot easily be detected. Furthermore, the strain gauge is generally sensitive to a temperature change, and it is not easy to accurately detect the displacement without an environmental influence. Additionally, methods of measuring sway as the displacement include a method of integrating accelerations calculated by an acceleration meter. However, a measurement accuracy of long period sway is low.

Moreover, a plurality of measurement points may be set in a structural object, for example, to grasp displacement of the structural object in detail. However, with the respective conventional methods, it is difficult to synchronize measurement timings at the respective measurement points, and the displacement of the structural object may not be able to be measured accurately.

Therefore, the purpose of this disclosure is to provide a program, method and device for detecting displacement of a structural object, which are capable of accurately measuring the displacement of the structural object.

SUMMARY OF THE DISCLOSURE

A displacement detecting device according to one aspect of this disclosure includes first and second attitude data calculators, a data extractor, and a displacement calculator. The first attitude data calculator is disposed at a first position of the structural object. The first attitude data calculator calculates attitude data of the first position by using received positioning signals, and calculates a calculated time point of the attitude data of the first position based on a time of a positioning system. The second attitude data calculator is disposed at a second position of the structural object. The second attitude data calculator calculates attitude data of the second position by using received positioning signals, and calculates a calculated time point of the attitude data of the second position based on a time of a positioning system. The data extractor extracts the attitude data of the first and second positions calculated at the same time point, based on the time of the positioning system. The displacement calculator calculates a displacement amount and a displacement direction of the structural object by using a difference between the attitude data of the first and second positions calculated at the same time point.

With the configuration, even when the attitude data of the plurality of positions in the structural object are individually calculated, the attitude data of the same time point can easily and accurately be extracted using the time of the positioning system to which the positioning signals belong. Thus, the displacement of the structural object can easily be calculated with a simple configuration.

A sharing system of displacement according to another aspect of this disclosure includes a plurality of displacement detecting devices, and the plurality of displacement detecting devices are disposed in different regions that are separated from each other. One of the displacement detecting devices, upon detecting displacement, transmits the detected displacement and a detected time point of the displacement based on the time of the positioning system to the other displacement detecting devices.

With the configuration, displacement can be calculated in a wide area and information of the displacement can be shared among respective regions of the area. Thus, for example, an earthquake notification system for a wide area can be configured and it can effectively be utilized in disaster defense.

Effect of the Disclosure

According to this disclosure, displacement of a structural object can accurately be detected while having a simple configuration.

BRIEF DESCRIPTION OF DRAWINGS

FIGS. 10A and 10B show views illustrating an example in which a displacement detecting device for a structural object according to a fifth embodiment of this disclosure is installed in a bridge.

MODES FOR CARRYING OUT THE DISCLOSURE

Figure 1:
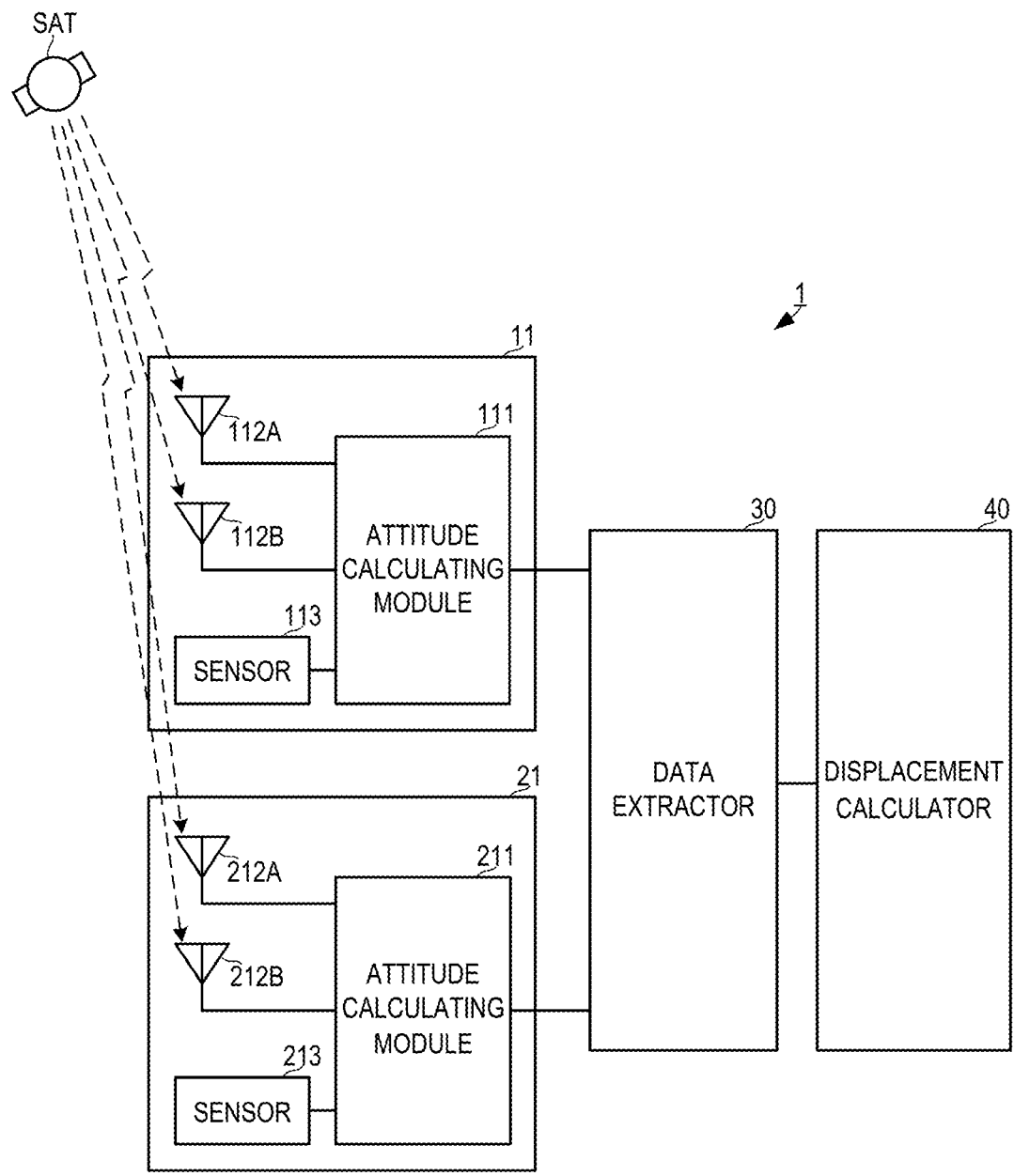
FIG. 1 is a configuration diagram of a displacement detecting device for a structural object according to a first embodiment of this disclosure.

A displacement detecting device for a structural object according to a first embodiment of this disclosure is described with reference to the drawings. FIG. 1 is a configuration diagram of the displacement detecting device for the structural object according to the first embodiment of this disclosure.

The displacement detecting device 1 includes a first attitude data calculator 11, a second attitude data calculator 21, a data extractor 30, and a displacement calculator 40. The first attitude data calculator 11 includes an attitude calculating module 111, antennas 112A and 112B, and a sensor 113. The second attitude data calculator 21 includes an attitude calculating module 211, antennas 212A and 212B, and a sensor 213.

Positioning signals are transmitted from positioning satellites SAT, and they are GPS signals of a GPS (Global Positioning System), for example. Each positioning signal is a signal formed by superimposing a navigation message on a carrier wave at a given frequency. The navigation message contains data required for positioning, such as time, a satellite location, and a satellite orbit. The positioning signal is a signal formed by code-modulating, with a pseudo noise code, the carrier wave on which the navigation message is superimposed. The pseudo noise code is unique to every positioning satellite. Note that in FIG. 1, although only one satellite SAT is illustrated, the plurality of positioning satellites SAT transmit positioning signals which are code-modulated with their respective unique pseudo noise codes. All the positioning satellites SAT transmit the positioning signals in synchronization with each other based on time of the positioning system (e.g., GPS time (weekly clock) of the GPS system). This GPS time corresponds to "time of the positioning system" of this disclosure.

The antennas 112A and 112B of the first attitude data calculator 11 receive the positioning signals and output them to the attitude calculating module 111. The sensor 113 includes an angular velocity sensor, for example. In this case, a configuration in which an angular velocity in a single axis perpendicular to two axes calculated using the positioning signals is obtained may be adopted. The sensor 113 outputs the angular velocity to the attitude calculating module 111.

The attitude calculating module 111 captures and tracks the positioning signals received by the antennas 112A and 112B, for every given sample timing. The attitude calculating module 111 calculates code pseudoranges etc. of the positioning signals, and calculates a base line vector between the antennas 112A and 112B, at every sample timing. The attitude calculating module 111 acquires the angular velocity from the sensor 113. The attitude calculating module 111 calculates an attitude of the first attitude data calculator 11 at a position thereof (corresponding to the "first position" of this disclosure) based on the base line vector and the angular velocity. Here, the attitude is calculated based on an angle formed by three perpendicular axes in an absolute coordinate system and the base line vector.

The attitude calculating module 111 demodulates the positioning signals received by the antennas 112A and 112B and analyzes the navigation messages. The attitude calculating module 111 acquires time of the positioning system contained in the navigation messages. The attitude calculating module 111 associates the calculated attitude with the time of the positioning system.

The attitude calculating module 111 calculates a difference between a given reference attitude and the calculated attitude to calculate a displacement vector of the attitude at the position of the first attitude data calculator 11. The reference attitude at the position of the first attitude data calculator 11 is an attitude calculated at the position of the first attitude data calculator 11 in a state, for example, with no displacement, and can be acquired when the displacement has not occurred before the acquisition. The attitude calculating module 111 associates the displacement vector of the attitude with the time of the positioning system, and outputs them as first attitude data, to the data extractor 30.

The antennas 212A and 212B of the second attitude data calculator 21 receive positioning signals and output them to the calculating module 211. The sensor 213 includes an angular velocity sensor, for example. In this case, a configuration in which an angular velocity in a single axis perpendicular to two axes calculated using the positioning signals is obtained may be adopted. The sensor 213 outputs the angular velocity to the calculating module 211.

The attitude calculating module 211 captures and tracks the positioning signals received by the antennas 212A and 212B, for every given sample timing. The attitude calculating module 211 calculates code pseudoranges etc. of the positioning signals, and calculates a base line vector between the antennas 212A and 212B, at every sample timing. The attitude calculating module 211 acquires the angular velocity from the sensor 213. The attitude calculating module 211 calculates an attitude of the second attitude data calculator 21 at a position thereof (corresponding to the "second position" of this disclosure) based on the base line vector and the angular velocity.

The attitude calculating module 211 demodulates the positioning signals received by the antennas 212A and 212B and analyzes the navigation messages. The attitude calculating module 211 acquires time of the positioning system contained in the navigation messages. The attitude calculating module 211 associates the calculated attitude with the time of the positioning system.

The attitude calculating module 211 calculates a difference between a given reference attitude and the calculated attitude to calculate a displacement vector of the attitude at the position of the second attitude data calculator 21. The reference attitude at the position of the second attitude data calculator 21 is an attitude calculated at the position of the second attitude data calculator 21 in a state, for example, with no displacement, and can be acquired when the displacement has not occurred before the acquisition. The attitude calculating module 211 associates the displacement vector of the attitude with the time of the positioning system, and outputs them as second attitude data, to the data extractor 30.

The positioning signals received by the antennas 212A and 212B and the positioning signals received by the antennas 112A and 112B belong to the same positioning system. Therefore, the time of the positioning system outputted by the attitude calculating module 211 matches with the time of the positioning system outputted by the attitude calculating module 111.

The data extractor 30 extracts the first and second attitude data of the same time point from the first and second attitude data received by the attitude calculating modules 111 and 211, respectively.

Specifically, the data extractor 30 compares the time of the positioning system associated with the first attitude data, with the time of the positioning system associated with the second attitude data. The data extractor 30 extracts the first and second attitude data of the same time point and associates them with this time point. The data extractor 30 outputs the first and second attitude data of the same time point to the displacement calculator 40 along with the time point.

The displacement calculator 40 calculates a displacement amount and a displacement direction of the structural object based on a difference between the first and second attitude data of the same time point. Specifically, the displacement calculator 40 acquires the displacement vector of the attitude at the position of the first attitude data calculator 11 based on the first attitude data associated with a time point t1 in the time of the positioning system.

The displacement calculator 40 acquires the displacement vector of the attitude at the position of the second attitude data calculator 21 based on the second attitude data associated with the time point t1 in the time of the positioning system.

When the displacement calculator 40 detects that the displacement vector of the attitude at the position of the first attitude data calculator 11 and the displacement vector of the attitude at the position of the second attitude data calculator 21 are both "0," the displacement calculator 40 determines that the displacement of the structural object has not occur.

When the displacement calculator 40 detects that at least one of the displacement vector of the attitude at the position of the first attitude data calculator 11 and the displacement vector of the attitude at the position of the second attitude data calculator 21 is not "0," the displacement calculator 40 calculates a difference between the displacement vector of the attitude at the position of the first attitude data calculator 11 and the displacement vector of the attitude at the position of the second attitude data calculator 21. The calculated difference is a vector amount and indicates the displacement amount and the displacement direction of the structural object. The displacement calculator 40 determines a kind of the displacement of the structural object based on the displacement amount and the displacement direction of the structural object. Kinds of the displacement of the structural object include torsion, bending, and sway which are described later.

By using the configuration of this embodiment as above, the attitudes detected at a plurality of different positions at the same time point can easily be extracted using the time of the positioning system. Therefore, a configuration and/or device to extract the attitudes of the same time point are not separately required. Further, by using the time of the same time positioning system, the attitude at the position of the first attitude data calculator 11 and the attitude at the position of the second attitude data calculator 21, which are of the same point, can accurately be extracted and the displacement amount and the displacement direction of the structural object can accurately be calculated.

Note that in the above description, a mode of using the two antennas and the single-axis sensor is described; however, each of the first and second attitude data calculators 11 and 21 may be configured in a mode of using a single antenna and a dual-axis sensor or a mode of using three antennas which are not in line. In any of these modes, by using the positioning signals which belong to the same positioning system, the first and second attitude data calculators 11 and 21 can obtain the calculation time point of the attitude data, and the displacement amount and the displacement direction of the structural object can accurately be calculated.

Further, in the above description, the case of receiving the positioning signals of the same positioning system by the first and the second attitude data calculators 11 and 21 is described. However, for example, in a case where positioning signals of a plurality of positioning systems of which reference times are different from each other are received, the times may be unified into a single positioning system by referring to a time difference between the plurality of positioning systems to which the received positioning signals respectively belong, and the attitude data of the same time point may be extracted.

Moreover, the positioning satellites which transmit the positioning signals received by the first attitude data calculator 11 are preferably all the same as the positioning satellites which transmit the positioning signals received by the second attitude data calculator 21; however, as long as the positioning signals are transmitted from the positioning satellites of the same positioning system, even if not all the positioning satellites are the same, the attitude data of the same time point can be extracted. For example, depending on the installation positions of the first and second attitude data calculators 11 and 21, the reception environment varies and combinations of receivable positioning signals may be different; however, as long as the positioning signals are transmitted from the positioning satellites of the same positioning system, similar operations and effects can be obtained. In this case, by providing a function to determine, using DOP etc., an accuracy of the attitude calculation to the first and second attitude data calculators 11 and 21, the attitudes calculated by the first and second attitude data calculators 11 and 21 can individually be highly accurate, and the displacement of the structural object can be calculated highly accurately.

Furthermore, as described above, by utilizing the navigation calculation using the positioning signals and the inertia calculation using the sensor, even in a period in which the positioning signals can no longer be received, the attitudes can be calculated. In this case, although the first and second attitude data calculators 11 and 21 can no longer acquire time from the positioning signals, by estimating beforehand errors of built-in device clocks provided to the respective calculators and correcting the errors sequentially at the time of the attitude calculation, even in the period in which the time cannot be acquired from the positioning signals, the attitude data of the same time point can be extracted.

Figure 2A:
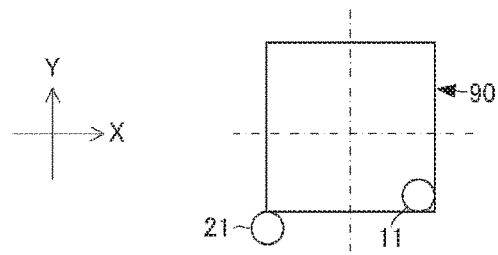
FIGS. 2A and 2B show views illustrating an example in which the displacement detecting device for the structural object according to the first embodiment of this disclosure is installed in a building.
Figure 2B:
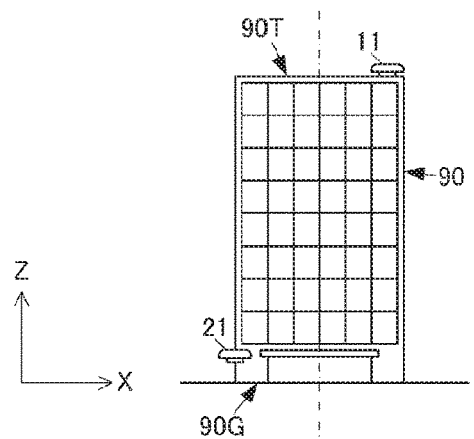

The respective components constituting the first attitude data calculator 11 are installed in a single housing, for example. The respective components constituting the second attitude data calculator 21 are installed in a different housing from the first attitude data calculator 11. FIGS. 2A and 2B show views illustrating an example in which the displacement detecting device for the structural object according to the first embodiment of this disclosure is installed in a building. FIG. 2A is a plan view of the building, and FIG. 2B is a side view of the building. Note that in FIGS. 2A and 2B, the first and second attitude data calculators 11 and 21 are illustrated magnified.

As illustrated in FIGS. 2A and 2B, the first attitude data calculator 11 is installed at a rooftop 90T of the building 90. The first attitude data calculator 11 is installed near one corner section of the rooftop 90T. The second attitude data calculator 21 is installed near a ground surface 90G of the building 90. Here, the second attitude data calculator 21 is disposed not to overlap with the first attitude data calculator 11 in the plan view. Note that, the second attitude data calculator 21 may overlap with the first attitude data calculator 11 in the plan view but preferably does not overlap therewith. Further, the positional relationship between the first and second attitude data calculators 11 and 21 in the plan view is not limited to the structure in FIG. 2A.

The first attitude data calculator 11 calculates displacement of the rooftop 90T of the building 90. The second attitude data calculator 21 calculates displacement near the ground surface 90G of the building 90.

The data extractor 30 extracts the first and second attitude data of the same time point based on the time of the positioning system. By utilizing the time of the positioning system, the first and second attitude data of the same time point can be extracted at high accuracy. The displacement calculator 40 determines the displacement of the building 90 by using the first and second attitude data of the same time point. Since the first and second attitude data of the same time point can accurately be extracted as above, the displacement of the building 90 can accurately be detected. Further, by using the positioning signals as described in this embodiment, the first and second attitude data of the same time point can be extracted based on the time of the positioning system obtained from the positioning signals. Therefore, the displacement of the building 90 can accurately be detected with a simple configuration.

Note that in the above description, the example in which the displacement vector of the attitude with respect to the reference attitude is used is described; however, the displacement vector can be calculated without using the reference attitude. In this case, the attitude data calculator 11 and the displacement calculator 40 calculate, as the displacement vector of the attitude, an attitude change from the position of the first attitude data calculator 11 at a first time point t1 to the position of the first attitude data calculator 11 at a second time point t2 in the time of the positioning system. The attitude data calculator 21 and the displacement calculator 40 calculate, as the displacement vector of the attitude, an attitude change from the position of the second attitude data calculator 21 at the first time point t1 to the position of the second attitude data calculator 21 at the second time point t2. The displacement calculator 40 calculates the displacement of the structural object based on the difference between the displacement vector of the attitude between the two time points at the position of the first attitude data calculator 11 and the displacement vector of the attitude between the two time points at the position of the second attitude data calculator 21.

In a specific mode, with no displacement of the building 90, the attitudes at the first and second attitude data calculators 11 and 21 remains the same as those when the first and second attitude data calculators 11 and 21 are installed. That is, the attitudes at the first and second attitude data calculators 11 and 21 do not change from the reference attitudes originally calculated at the time of installation. Therefore, the displacement vectors of the attitudes at the first and second attitude data calculators 11 and 21 are both "0."

When the displacement, for example, torsion or bending, occurs in the building 90, at least one of the attitudes at the first and second attitude data calculators 11 and 21 changes according to the disposed positions of the first and second attitude data calculators 11 and 21. Therefore, the displacement vector of at least one of the attitudes at the first and second attitude data calculators 11 and 21 is not "0."

For example, as illustrated in FIGS. 2A and 2B, the first attitude data calculator 11 installed at the rooftop 90T easily receives an influence of the displacement of the building 90. On the other hand, the second attitude data calculator 21 installed near the ground surface 90G does not easily receive the influence of the displacement of the building 90. Therefore, when the displacement occurs in the building 90, the attitudes at the first and second attitude data calculators 11 and 21 change differently, and the displacement vectors of the attitudes at the first and second attitude data calculators 11 and 21 become different. Particularly, as illustrated in FIGS. 2A and 2B, by providing the respective attitude data calculators at the positions where the influence level of the displacement of the building 90 is significantly different from each other, a difference between the displacement vectors of the attitudes can be calculated large. Thus, the displacement amount and the displacement direction of the building 90 become easier to calculate.

The displacement calculator 40, by calculating this difference between the displacement vectors of the attitudes, can detect whether the displacement has occurred in the building 90, and calculate the displacement amount and the displacement direction of the building 90.

Figure 3A:
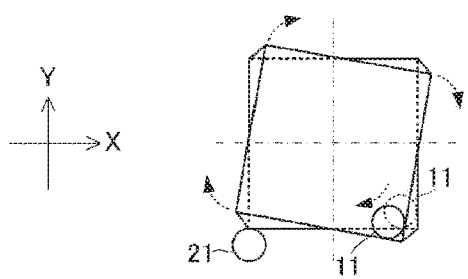
FIGS. 3A and 3B show views illustrating an example of a behavior of the building when torsion occurs in the building according to the first embodiment of this disclosure.
Figure 3B:
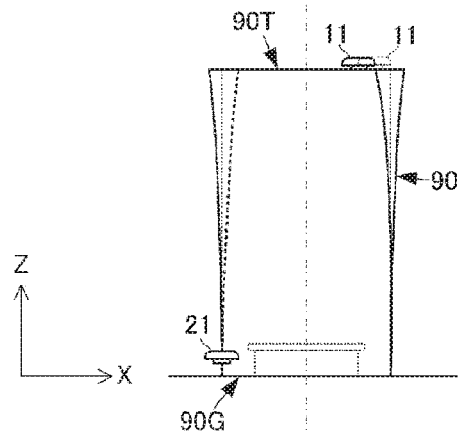

FIGS. 3A and 3B show views illustrating an example of a behavior of the building when torsion occurs in the building. FIG. 3A is a plan view of the building, and FIG. 3B is a side view of the building. Note that, the views of FIGS. 3A and 3B are illustrated by having FIGS. 2A and 2B as a reference state (the state without the displacement).

As illustrated in FIGS. 3A and 3B, when the torsion occurs in the building 90, the building 90 deforms such that the rooftop 90T of the building 90 turns within a plane (X-Y plane of FIG. 3A) parallel to the ground surface. On the other hand, a distance from the ground surface of the building 90 to the rooftop 90T (distance in a Z-direction of FIG. 3B) almost does not change. Further, the building 90 almost does not deform in a part close to the ground surface 90G Therefore, the displacement vector of the attitude obtained by the first attitude data calculator 11 installed at the rooftop 90T is large, and the displacement vector of the attitude obtained by the second attitude data calculator 21 installed near the ground surface 90G is small.

The displacement calculator 40 can detect that the torsion has occurred in the building 90, by detecting the displacement amount and the displacement direction of the building 90 based on the difference between the displacement vectors of the attitudes which are obtained by the first and second attitude data calculators 11 and 21.

Figure 4A:
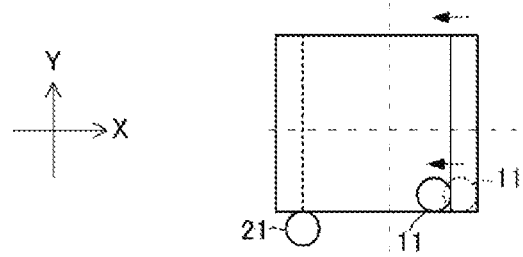
FIGS. 4A and 4B show views illustrating an example of a behavior of the building when bending occurs in the building according to the first embodiment of this disclosure.
Figure 4B:
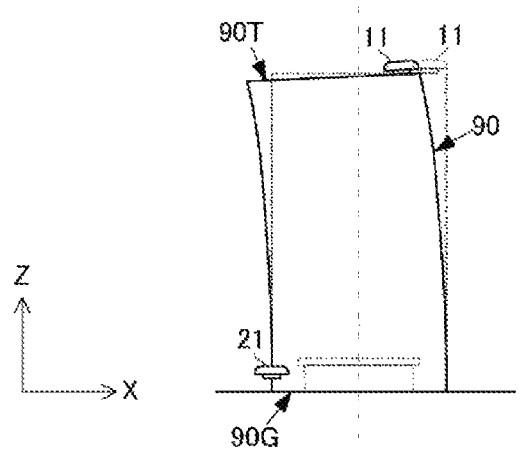

FIGS. 4A and 4B show views illustrating an example of a behavior of the building when bending occurs in the building. FIG. 4A is a plan view of the building, and FIG. 4B is a side view of the building. Note that, the views of FIGS. 4A and 4B are illustrated by having FIGS. 2A and 2B as a reference state (the state without the displacement).

As illustrated in FIGS. 4A and 4B, when the bending occurs in the building 90, the building 90 deforms such that one end of the rooftop 90T of the building 90 approaches the ground surface. Further, in the plan view of the building 90, the building 90 deforms such that the rooftop 90T translates. On the other hand, the building 90 almost does not deform in the part close to the ground surface 90G Therefore, the displacement vector of the attitude obtained by the first attitude data calculator 11 installed at the rooftop 90T is large, and the displacement vector of the attitude obtained by the second attitude data calculator 21 installed near the ground surface 90G is small.

The displacement calculator 40 can detect that the bending has occurred in the building 90, by detecting the displacement amount and the displacement direction of the building 90 based on the difference between the displacement vectors of the attitudes which are obtained by the first and second attitude data calculators 11 and 21.

Since the displacement amount and the displacement direction of the building 90 are different between the torsion and the bending, the difference between the displacement vectors of the attitudes obtained by the first and second attitude data calculators 11 and 21 is also different. Therefore, based on the characteristic of this difference between the displacement vectors of the attitudes, not only the displacement of the building 90, but also the kind of the displacement, such as the torsion or the bending, can be detected.

Since the displacement of the building 90 can be calculated as above, effective maintenance, earthquake resistance, and earthquake resistance protection of the building 90 can surely be performed, understood, and determined, respectively. Further, a damage of the building 90 from a natural disaster can accurately be determined.

Figure 5:
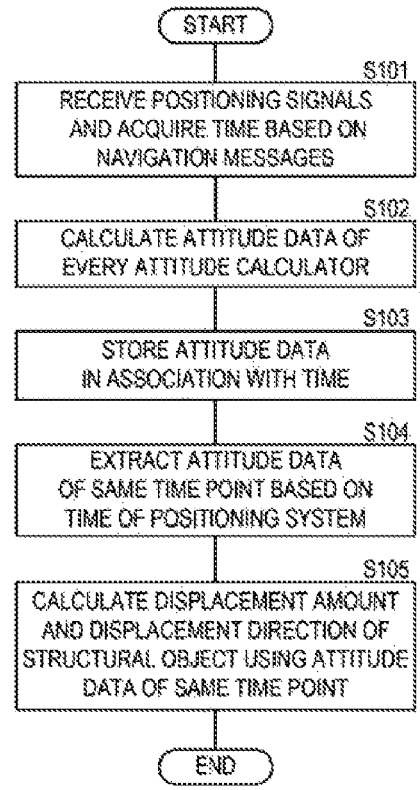
FIG. 5 is a flowchart of a method of detecting the displacement of the structural object according to the first embodiment of this disclosure.

Note that in the above description, the example in which the processings are performed by being assigned to the plurality of functional blocks, respectively, is described; however, upon the determination of the disposed positions of the antennas 112A, 112B, 212A and 212B, and the sensors 113 and 213 as described above, by causing a computer to execute a program which achieves a flow described next, the displacement of the building 90 can be detected. FIG. 5 is a flowchart of a method of detecting the displacement of the structural object according to the first embodiment of this disclosure.

First, the computer acquires the positioning signals received by the antennas 112A and 112B, which are located at the first position, and the antennas 212A and 212B, which are located at the second position, and acquires the navigation messages by tracking the positioning signals. The computer acquires the time of the positioning system based on the navigation messages (S101).

The computer calculates the first attitude data regarding the first position and the second attitude data regarding the second position (S102).

Next, the computer stores the first and second attitude data in association with the acquired time of the positioning system (S103).

Next, the computer extracts the first and second attitude data calculated at the same time point, based on the time of the positioning system (S104).

Next, the computer calculates the displacement amount and the displacement direction of the structural object based on the comparison result between the first and second attitude data of the same time point, for example, the difference between the displacement vectors of the attitudes obtained at the first and second positions (S105).

Figure 6A:
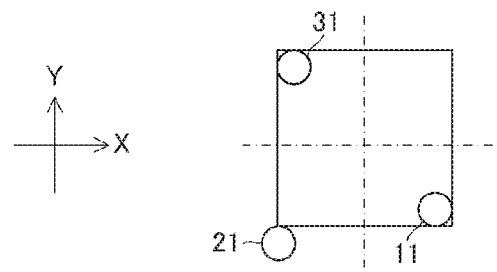
FIGS. 6A and 6B show views illustrating an example in which a displacement detecting device for a structural object according to a second embodiment of this disclosure is installed in a building.
Figure 6B:
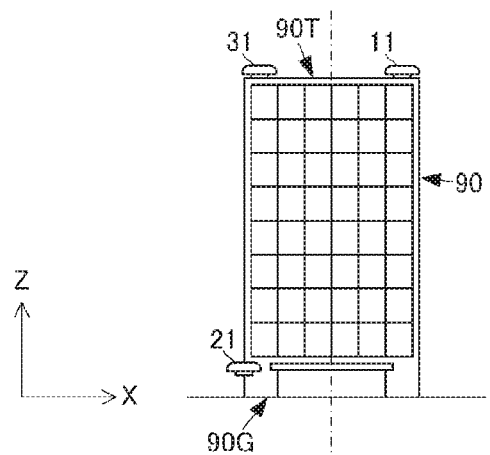

Next, a displacement detecting device for a structural object according to a second embodiment is described with reference to the drawings. FIGS. 6A and 6B show views illustrating an example in which the displacement detecting device for the structural object according to the second embodiment of this disclosure is installed in a building. FIG. 6A is a plan view of the building, and FIG. 6B is a side view of the building. Note that in FIGS. 6A and 6B, first, second and third attitude data calculators 11, 21 and 31 are illustrated magnified.

The displacement detecting device for the structural object according to this embodiment is the displacement detecting device 1 described in the first embodiment, with the third attitude data calculator 31 added thereto. The third attitude data calculator 31 has the same internal configuration as the first and second attitude data calculators 11 and 21, generates third attitude data, and outputs it to a displacement calculator via a data extractor. Similar to the embodiment described above, the displacement calculator calculates displacement of the building 90, such as torsion, bending, etc., by using differences among the first to third attitude data. By increasing the calculation points of the attitude data as above, the displacement of the building 90 can be detected more specifically. Note that, although the example in which three attitude data calculators are used is described in this embodiment, the number of the attitude data calculators may be four or higher.

Figure 7A:
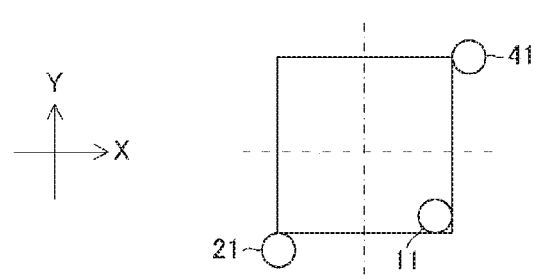
FIGS. 7A and 7B show views illustrating an example in which a displacement detecting device for a structural object according to a third embodiment of this disclosure is installed in a building.
Figure 7B:
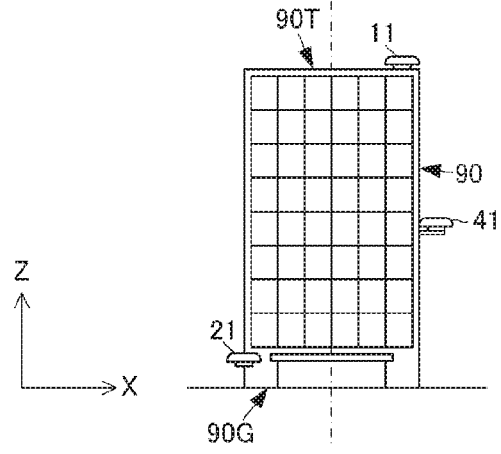

Next, a displacement detecting device for a structural object according to a third embodiment is described with reference to the drawings. FIGS. 7A and 7B show views illustrating an example in which the displacement detecting device for the structural object according to the third embodiment of this disclosure is installed in a building. FIG. 7A is a plan view of the building, and FIG. 7B is a side view of the building. Note that in FIGS. 7A and 7B, first, second and fourth attitude data calculators 11, 21 and 41 are illustrated magnified.

The displacement detecting device for the structural object according to this embodiment is the displacement detecting device 1 described in the first embodiment, with the fourth attitude data calculator 41 added thereto. The fourth attitude data calculator 41 has the same internal configuration as the first and second attitude data calculators 11 and 21, generates fourth attitude data, and outputs it to a displacement calculator via a data extractor. The fourth attitude data calculator 41 is installed at an intermediate position between a rooftop 90T and a ground surface 90G in a height direction of the building 90. By using such a configuration, sway of the building 90 can be detected.

Figure 8:
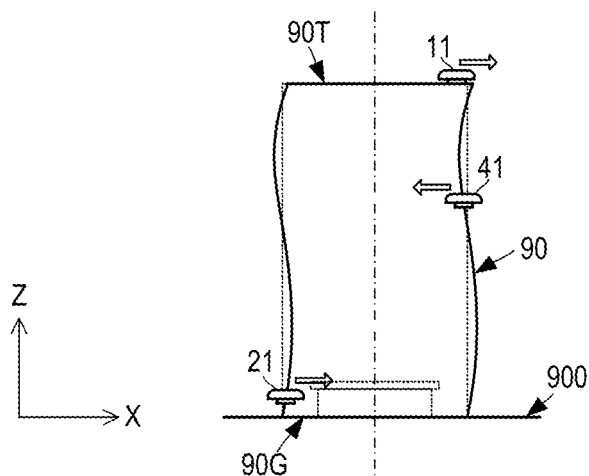
FIG. 8 is a view illustrating an example of a behavior of the building when the building sways according to the third embodiment of this disclosure.

FIG. 8 is a view illustrating an example of a behavior of the building when the building sways. Note that, the view of FIG. 8 is illustrated by having Part (B) of FIG. 2 as a reference state (the state without the displacement).

As indicated by the white arrows of FIG. 8, when the sway occurs in the building 90, depending on the height direction of the building 90, the displacement amount and the displacement direction in directions parallel to the ground surface vary-. Therefore, by using the following method, the sway of the building 90 can be detected. An attitude data calculator is disposed at a plurality of positions in the height direction of the building 90. Each attitude data calculator continuously calculates a displacement vector of an attitude (particularly, a displacement amount of an attitude in a direction parallel to the ground surface). When the sway occurs, the displacement vector of the attitude is different depending on the position in the height direction of the building 90. Therefore, the displacement calculator can detect the sway of the building 90 by comparing time changes of the displacement vectors of the attitudes calculated by the respective attitude data calculators.

Note that, in the case of detecting such sway, by detecting an acceleration based on the positioning signals or a sensor, the sway can more easily be detected.

Further, by detecting the sway as above, in an earthquake, an influence on the building 90 can accurately be detected. Therefore, the detection can effectively be utilized in determining the earthquake resistance protection, a damage situation from the earthquake, whether to evacuate, etc.

Figure 9A:
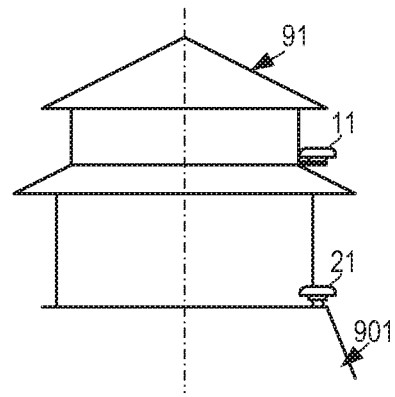
FIGS. 9A to 9C show views illustrating modes in which a displacement detecting device for a structural object according to a fourth embodiment of this disclosure is utilized in detecting an aged deterioration of a house.
Figure 9B:
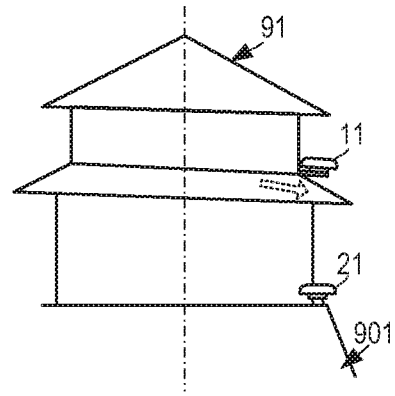
Figure 9C:
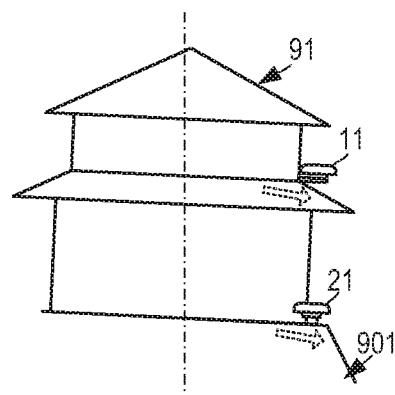

Next, a displacement detecting device for a structural object according to a fourth embodiment of this disclosure is described with reference to the drawings. FIGS. 9A to 9C show views illustrating modes in which the displacement detecting device for the structural object according to the fourth embodiment of this disclosure is utilized in detecting an aged deterioration of a house. FIG. 9A illustrates an original state of the house when built, FIG. 9B illustrates a state of the house after an aged deterioration has occurred, and FIG. 9C illustrates a state after a foundation has deformed.

As illustrated in FIGS. 9A to 9C, in this embodiment, a first attitude data calculator 11 is installed on the house 91, and a second attitude data calculator 21 is installed in the foundation 901. As illustrated in FIGS. 9A and 9B, when the house 91 inclines due to the aged deterioration, an attitude calculated by the first attitude data calculator 11 changes. Here, the foundation 901 has not deformed, an attitude calculated by the second attitude data calculator 21 does not change.

Therefore, a displacement calculator continuously stores a displacement vector of the attitude of the first attitude data calculator 11 and a displacement vector of the attitude of the second attitude data calculator 21. Then, when the displacement calculator detects that the displacement vector of the attitude at the second attitude data calculator 21 is substantially "0" and detects a significant change in a difference between the displacement vectors of the attitudes at the first and second attitude data calculators 11 and 21, the displacement calculator can detect that the house 91 has inclined due to the aged deterioration.

As illustrated in FIGS. 9A and 9C, when the foundation 901 inclines due to the aged deterioration, both the attitudes calculated by the first and second attitude data calculators 11 and 21 change.

Therefore, the displacement calculator continuously stores the displacement vector of the attitude of the first attitude data calculator 11 and the displacement vector of the attitude of the second attitude data calculator 21. Then, when the displacement calculator detects that the displacement vectors of the attitudes of the first and second attitude data calculators 11 and 21 are not "0" but are large and detects substantially no change in the difference between the displacement vectors of the attitudes of the first and second attitude data calculators 11 and 21, the displacement calculator can detect that the house 91 has inclined due to the deformation of the foundation 901.

Note that, although the example of the detection of the aged deterioration is described in this embodiment, inclination of the house 91 and deformation of the foundation 901 due to a natural disaster, such as an earthquake or a rainstorm, can also be detected.

Next, a displacement detecting device for a structural object according to a fifth embodiment of this disclosure is described with reference to the drawings. While the architectural objects, such as the building and the house, are described as examples of the structural object in the respective embodiments described above, in this embodiment, a case of application to a bridge is described. FIGS. 10A and 10B show views illustrating an example in which the displacement detecting device for the structural object according to the fifth embodiment of this disclosure is installed in the bridge. FIG. 10A is a side view of the bridge, and FIG. 10B is a front elevational view of the bridge. Note that in FIGS. 10A and 10B, first, second and third attitude data calculators 11, 21 and 31 are illustrated magnified.

The bridge 92 includes main towers 921 and 922, a main girder 923, and suspension wires 924. The main girder 923 has a shape extending in a crossing direction of the bridge 92. The main towers 921 and 922 are disposed at intermediate positions of the main girder 923 in its extending direction. The main girder 923 is lifted to the main towers 921 and 922 by using the plurality of suspension wires 924.

To such a bridge 92, the first and second attitude data calculators 11 and 21 are installed near a tip of the main tower 921 and a tip of the main tower 922, respectively. Thus, displacement vectors of attitudes of the tips of the main towers 921 and 922 can be detected, and torsion and bending of the main towers 921 and 922 can be detected. As a result, torsion and bending of the bridge 92 can be detected. Note that, the torsion of the bridge 92 indicates a turn by having an axis as an L-direction of FIG. 10A, in other words, the extending direction of the main girder 923, and indicates a state where a turn amount and a turn direction vary depending on the position, for example, the main tower 921 or 922. Further, the bending of the bridge 92 indicates a state where part of the main girder 923 is displaced in an H-direction of FIGS. 10A and 10B.

Moreover, as illustrated in FIGS. 10A and 10B, the third attitude data calculator 31 may be installed in the main girder 923, at a median position between the main tower 921 and the main tower 922. By installing the third attitude data calculator 31, the bending of the main girder 923 can be detected. Thus, the torsion and the bending of the bridge 92 can be detected from a more variety of aspects. Further, by disposing the third attitude data calculator 31 at a position that is substantially a center of the main girder 923 in its extending direction, in other words, substantially a median between the positions of the main towers 921 and 922, the bending of the bridge 92 can more surely be detected.

By calculating such torsion, bending etc. of the bridge 92, a load on the bridge 92 caused by a natural disaster, such as a strong wind or an earthquake, can be detected, and the detection can effectively be utilized in determining whether to prohibit crossing, etc., and a maintenance inspection.

Figure 11:
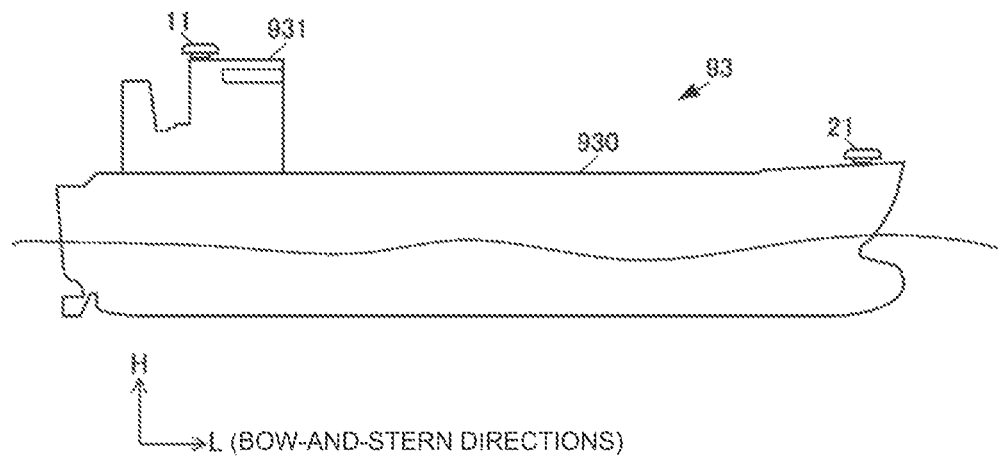
FIG. 11 is a view illustrating an example in which a displacement detecting device for a structural object according to a sixth embodiment of this disclosure is installed in a ship.

Next, a displacement detecting device for a structural object according to a sixth embodiment of this disclosure is described with reference to the drawing. While the architectural objects, such as the building and the house, and the bridge are described as examples of the structural object in the respective embodiments described above, in this embodiment, a case of application to a ship is described. FIG. 11 is a view illustrating an example in which the displacement detecting device for the structural object according to the sixth embodiment of this disclosure is installed in the ship. Note that in FIG. 11, a side view of the ship is illustrated and first and second attitude data calculators 11 and 21 are illustrated magnified.

The ship 93 includes a hull 930 and a bridge 931 provided with a control room etc. The hull 930 is long in bow-and-stern directions, and the bridge 931 is disposed at a stern-side position of the hull 930.

The first attitude data calculator 11 is installed near the bow of the hull 930. The second attitude data calculator 21 is installed near the stern of the hull 930, for example, a rooftop of the bridge 931. Thus, displacement vectors of attitudes of tips of the bow and stern of the hull 930 can be detected, and torsion and bending of the ship 93 can be detected. Note that, the torsion of the ship 93 indicates a turn by having an axis as an L-direction of FIG. 11 (bow-and-stern directions), and indicates a state where a turn amount and a turn direction are different depending on the position, for example, the bow or the stern. Further, the bending of the ship 93 indicates a state where displacement of the hull 930 in an H-direction of FIG. 11 is different at each position in the hull 930 in the L-direction (bow-and-stern directions).

By calculating the displacement, such as the torsion, the bending etc. of the ship 93, a load on the ship 93 caused by a natural disturbance, such as a wave and/or a wind, can be detected, and the detection can effectively be utilized in determining whether to lower a traveling speed and whether to prohibit the travel, and a maintenance inspection.

Note that in the respective embodiments described above, a configuration in which the respective attitude data calculators, the data extractor, and the displacement calculator are connected is described. The communication mode of achieving this connection may be with wire or wireless. Further, in a case where a necessity of being in real time is not required, the respective attitude data calculators may store the attitude data, then output the attitude data to the data extractor and the displacement calculator, and calculate the displacement of the structural object. Alternatively, the tracking result of the positioning signals received by the antennas (base line vectors etc.) and the output data from the sensors (angular velocity etc.) may be stored such that the attitude is then calculated. Either of these configurations may be used especially when maintaining and inspecting the structural object.

Additionally, in the respective embodiments described above, each attitude data calculator is provided separately from the data extractor and the displacement calculator, and integrated with the antenna and the sensor. However, the attitude data calculator may be integrated with the data extractor and the displacement calculator, and be provided separately from the antenna and the sensor.

Figure 12:
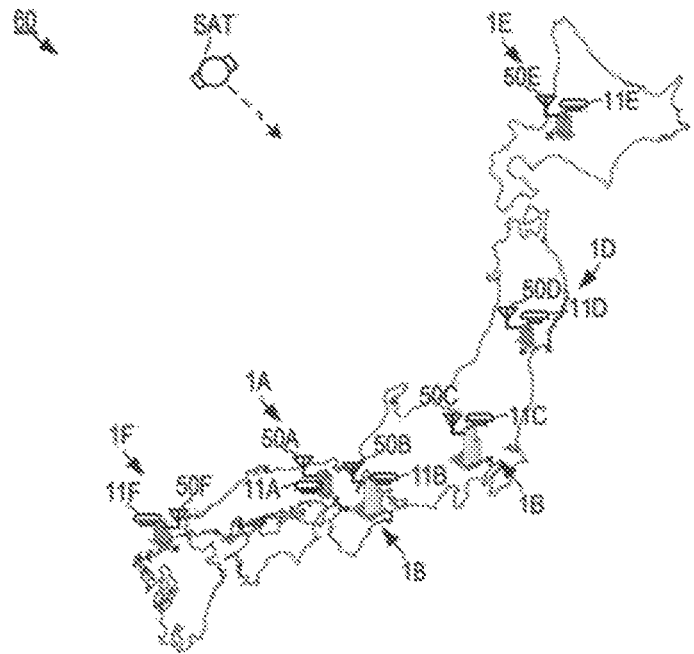
FIG. 12 is a view illustrating a concept of a sharing system of displacement according to a seventh embodiment of this disclosure.
Figure 13:
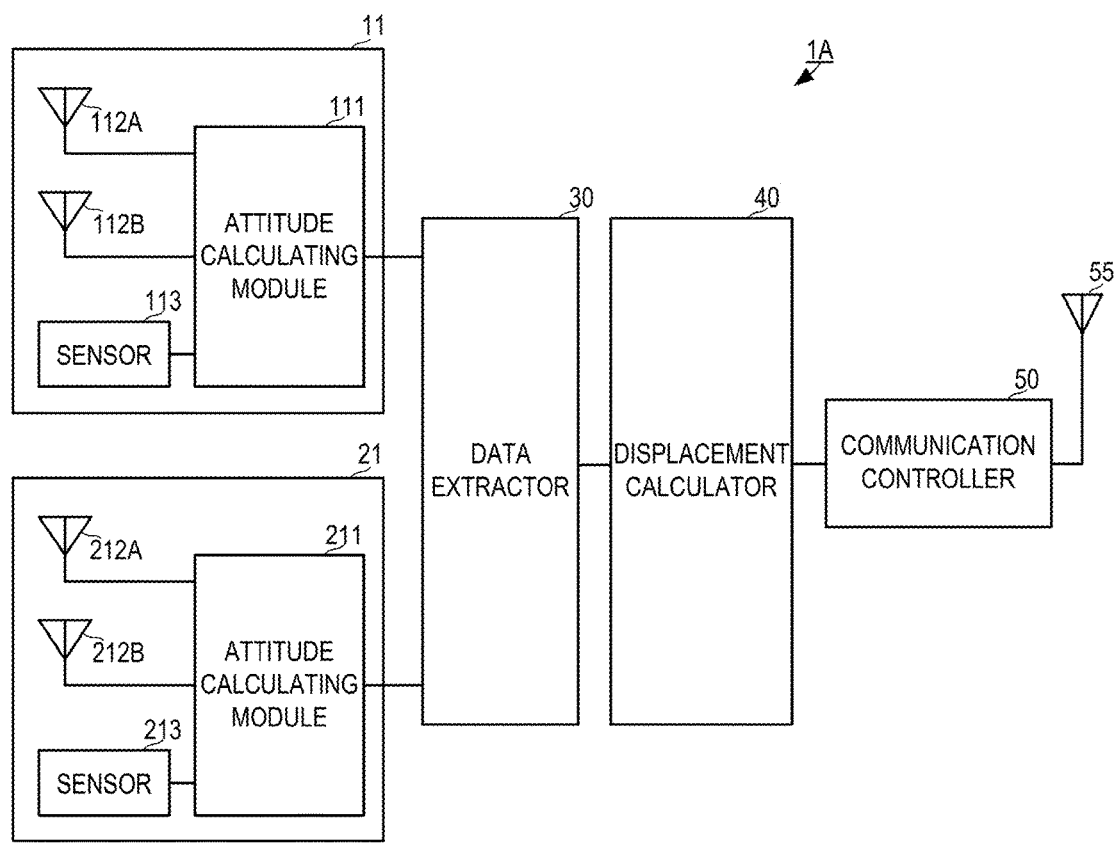
FIG. 13 is a block diagram illustrating a configuration of a displacement detecting device used in the sharing system of the displacement according to the seventh embodiment of this disclosure.

Next, a sharing system of displacement according to a seventh embodiment of this disclosure is described with reference to the drawings. FIG. 12 is a view illustrating a concept of the sharing system of displacement according to the seventh embodiment of this disclosure. FIG. 13 is a block diagram illustrating a configuration of a displacement detecting device used in the sharing system of displacement according to the seventh embodiment of this disclosure.

As illustrated in FIG. 12, the sharing system 90 of displacement of a structural object includes a plurality of displacement detecting devices 1A, 1B, 1C, 1D, 1E and 1F. An entire area where the displacement is desired to be shared is divided into a plurality of regions, and the displacement detecting devices 1A to 1F are disposed in the respective regions. Each of the displacement detecting devices 1A to 1F is installed in, for example, a tall building built in the corresponding region.

As illustrated in FIG. 13, the displacement detecting device 1A is the displacement detecting device 1 described above, with a communication controller 50 and a communication antenna 55 added thereto. Other parts of the configuration are the same as those of the displacement detecting device 1 described above. Further, the displacement detecting devices 1A to 1F basically have the same configuration as each other. Therefore, only the displacement detecting device 1A is described in detail.

The communication controller 50 of the displacement detecting device 1A transmits via the communication antenna 55 the displacement (displacement amount and displacement direction) of the structural object, which is outputted by the displacement calculator 40. Further, the communication controller 50 acquires via the communication antenna 55 displacements detected by the other displacement detecting devices and performs particular notification and informing processing.

By using the sharing system 90 of displacement having such a configuration, an alarm system for earthquake can be achieved, for example. When an earthquake occurs, displacement of a structural object due to the earthquake is calculated by the displacement detecting device located closest to a source location of the earthquake. The displacement detecting device which calculated the displacement of the structural object due to the earthquake, notifies the occurrence of the displacement of the structural object due to the earthquake, to the other displacement detecting devices through wireless communication. Here, the displacement detecting device which calculated the displacement of the structural object due to the earthquake, notifies a time of the displacement occurrence (time of earthquake occurrence), the detected displacement amount and displacement direction, a cycle of the displacement (e.g., sway cycle), etc., based on time of a positioning system.

The other displacement detecting devices, upon receiving the occurrence of the displacement of the structural object, for example, estimates an estimated time of arrival of the shock of the earthquake in the regions where the displacement detecting devices are located, respectively. Here, since the displacement detecting devices of this embodiment use positioning signals, the time of occurrence can be obtained accurately based on the time of the positioning system. Thus, even if the displacement detecting device on the side of receiving the notification is located far from the displacement detecting device on the notifying side, the estimated time of arrival can accurately be estimated. As a result, more useful and reliable notification can be performed to the regions where the other displacement detecting devices are disposed.

More specifically, a propagation speed of a long period earthquake motion is 3 to 7 km/sec. Therefore, in a case where an earthquake occurs in the Hanshin Region, it takes over one minute for the long period earthquake motion to reach the Tohoku Region. Therefore, by notifying via the wireless communication that the long period earthquake motion has occurred in the Hanshin Region, in the Tohoku Region, countermeasures against the long period earthquake motion can surely be implemented before the long period earthquake motion reaches. Thus, it is extremely effective from an aspect of disaster defense.

DESCRIPTION OF REFERENCE NUMERALS 1, 1A Displacement Detecting Device
11, 21, 31, 41 Attitude Data Calculator
30 Data Extractor
40 Displacement Calculator
50 Communication Controller
55 Communication Antenna
60 Sharing System of Displacement
90 Building
90T Rooftop
90G Ground Surface
91 House
92 Bridge
93 Ship
111, 211 Attitude Calculating Module
112A, 112B, 212A, 212B Antenna
113,213 Sensor
901 Foundation

The invention claimed is:

1. A displacement detecting device for a structural object, comprising:
a first attitude data calculator:
disposed with two first antennas at a first position of the structural object,
configured to calculate a first base line vector between the two first antennas by using received positioning signals,
configured to calculate first attitude data of the first position based on an angle formed by three perpendicular axes in an absolute coordinate system and the first base line vector, and
configured to acquire a time point of the first attitude data of the first position based on a time of a positioning system;
a second attitude data calculator:
disposed with two second antennas at a second position of the structural object,
configured to calculate a second base line vector between the two second antennas by using received positioning signals,
configured to calculate second attitude data of the second position based on an angle formed by the three perpendicular axes in an absolute coordinate system and the second base line vector, and
configured to acquire a time point of the second attitude data of the second position based on the time of the positioning system;
a data extractor:
configured to compare the time point of the first attitude data and the time point of the second attitude data and determine that they are the same, and
configured to extract the first attitude data and the second attitude data based on the comparison; and
a displacement calculator configured to calculate a displacement amount and a displacement direction of the structural object by using a difference between the first attitude data and the second attitude data.

2. The displacement detecting device for the structural object of claim 1, wherein the first attitude data calculator calculates a displacement vector of an attitude with respect to a reference attitude at the first position, as the first attitude data, and
wherein the second attitude data calculator calculates a displacement vector of an attitude with respect to a reference attitude at the second position, as the second attitude data.

3. The displacement detecting device for the structural object of claim 2, wherein the displacement calculator detects whether displacement of the structural object exists, based on the displacement amount and the displacement direction of the structural object.

4. The displacement detecting device for the structural object of claim 3, wherein the displacement calculator detects a kind of the displacement of the structural object based on the displacement amount and the displacement direction of the structural object.

5. The displacement detecting device for the structural object of claim 4, wherein the displacement of the structural object is at least one of torsion, bending and sway of the structural object.

6. The displacement detecting device for the structural object of claim 5, wherein the displacement calculator stores the displacement amount and the displacement direction of the structural object over a given period of time, and then detects an aged deterioration of the structural object based on a time change of the displacement amount and the displacement direction of the structural object.

7. A sharing system of displacement of a structural object, comprising the displacement detecting device for the structural object of claim 6, wherein the displacement detecting device is one of a plurality of displacement detecting devices,
wherein the plurality of displacement detecting devices are disposed in different regions that are separated from each other, and
wherein one of the displacement detecting devices, upon detecting displacement, transmits the detected displacement and a detected time point of the displacement based on the time of the positioning system to the other displacement detecting devices.

8. The displacement detecting device for the structural object of claim 1, wherein the displacement calculator detects whether displacement of the structural object exists, based on the displacement amount and the displacement direction of the structural object.

9. The displacement detecting device for the structural object of claim 8, wherein the displacement calculator detects a kind of the displacement of the structural object based on the displacement amount and the displacement direction of the structural object.

10. The displacement detecting device for the structural object of claim 9, wherein the displacement of the structural object is at least one of torsion, bending and sway of the structural object.

11. The displacement detecting device for the structural object of claim 8, wherein the displacement calculator stores the displacement amount and the displacement direction of the structural object over a given period of time, and then detects an aged deterioration of the structural object based on a time change of the displacement amount and the displacement direction of the structural object.

12. A sharing system of displacement of a structural object, comprising the displacement detecting device for the structural object of claim 1, wherein the displacement detecting device is one of a plurality of displacement detecting devices,
wherein the plurality of displacement detecting devices are disposed in different regions that are separated from each other, and wherein one of the displacement detecting devices, upon detecting displacement, transmits the detected displacement and a detected time point of the displacement based on the time of the positioning system to the other displacement detecting devices.

13. A method of detecting displacement of a structural object, comprising: disposing two first antennas at a first position of the structural object, calculating a first base line vector between the two first antennas by using received positioning signals, calculating first attitude data of the first position based on an angle formed by three perpendicular axes in an absolute coordinate system and the first base line vector, and acquiring a time point of the first attitude data based on a time of a positioning system;

disposing two second antennas at a second position of the structural object, calculating a second base line vector between the two second antennas by using received positioning signals, calculating second attitude data of the second position based on an angle formed by three perpendicular axes in an absolute coordinate system and the second base line vector, and acquiring a time point of the second attitude data based on the time of the positioning system;

comparing the time point of the first attitude data and the time point of the second attitude data and determine that they are the same;

extracting the first attitude data and the second attitude data, based on the comparison; and calculating a displacement amount and a displacement direction of the structural object by using a difference between the first attitude and the second attitude data.

* * * * *